Figure 1:
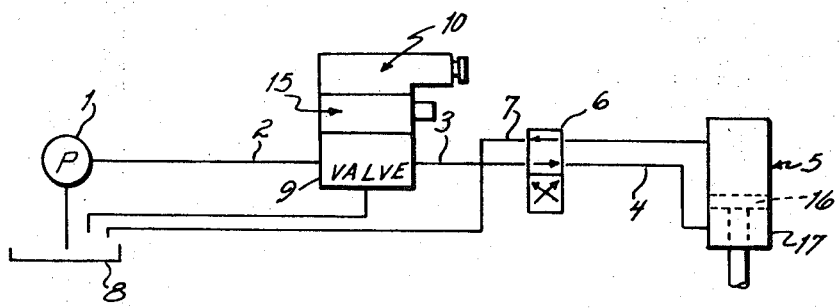

United States Patent

[11] 3,578,018

| [72] | Inventors | Leo H. Dillon<br>Columbus, Ohio;<br>William F. Weese, Lawndale, Calif. |
|---|---|---|
| [21] | Appl. No. | 817,447 |
| [22] | Filed | Apr. 18, 1969 |
| [45] | Patented | May 11, 1971 |
| [73] | Assignee | Abex Corporation<br>New York, N.Y. |

[54] RATE OF PRESSURE RISE LIMITING VALVE
23 Claims, 4 Drawing Figs.

[52] U.S. Cl. .................................................. 137/489,
 137/491
[51] Int. Cl. ...................................................... F16k 17/10
[50] Field of Search........................................... 137/489,
 491, 489.3, 492, 492.5, 488, 471, 486, 473, 483,
 484.6, 484.8, 487, 489.5, 501, 505.11, 505.12,
 505.15, 505.3, 509, 510, (Inquired); 251/26, 29

[56] References Cited
UNITED STATES PATENTS

| 2,388,820 | 11/1945 | Bonnell............................ | 137/491 |
| 2,635,574 | 4/1953 | Sturtevant..................... | 137/510X |
| 3,180,355 | 4/1965 | Long............................. | 251/26X |

Primary Examiner—M. Cary Nelson
Assistant Examiner—Robert J. Miller
Attorney—Wood, Herron and Evans

ABSTRACT: A valve for preventing pressures in a fluid line from exceeding a preset value by venting fluid to a reservoir whenever the rate of pressure increase in the line exceeds some predetermined value or rate of gain. The valve is operative to open and spill fluid to relieve the increasing pressure condition whenever it detects an excessive rate of pressure increase, irrespective of the pressure at which the increase is initiated.

RATE OF PRESSURE RISE LIMITING VALVE

This invention relates to hydraulic control apparatus and, more particularly, to a control valve for use in a hydraulic system to prevent the pressure gains or rate of increases in the system from exceeding a predetermined maximum value. This unit is particularly useful as a pilot unit in combination with the second stage of a two stage relief valve to prevent pressure gains from exceeding a predetermined value. It is also useful as a rate of pressure limiting valve in and of itself without the maximum pressure limiting function of relief valves.

In many hydraulic apparatus applications, there is a need for some control apparatus to iron out or eliminate momentary or short duration pressure peaks which occur as a result of shock loading of the system. Examples of conditions which cause such instantaneous pressure peaks are bottoming of a ram or piston in a cylinder, blockage of a hydraulic line, or mechanical impact loading of a piece of hydraulically actuated machinery. Whenever any one of these conditions occurs, there is an instantaneous pressure buildup in the hydraulic system. If the rate of gain of the pressure increase is faster than any piece of safety apparatus, such as the pressure relief valve, can detect and react to relieve the increasing pressure, the result is broken equipment such as broken fluid lines, broken pumps, or broken motors.

It has therefore been one objective of this invention to provide a control valve operable to detect excessive rates of pressure increase in hydraulic lines and to bypass fluid to a low pressure zone before the pressure peaks can occur or before the pressure can exceed a safe value.

Another objective of this invention has been to provide a rate of pressure control valve which is responsive to gains in pressure irrespective of the pressure level at which the gain is initiated. Heretofore, rate of pressure increase control valves or valves which respond to pressure gains have always had a pressure characteristic; i.e., a pressure range in which the valve was operable and a fixed minimum pressure level to which the valve would respond.

Still another objective of this invention has been to provide a pressure gain responsive control valve or a rate of pressure increase responsive valve which is adjustable to vary the rate of gain to which the valve responds.

Still another objective of this invention has been to provide a rate of pressure gain responsive control valve which is useful either as a single stage valve or in combination with a second stage to spill large quantities of fluid. The rate of pressure gain control of this invention is operative to dump or spill small quantities of fluid to exhaust upon detection of a fast rate of pressure gain and if larger quantities of fluid are required to be dumped, the second stage valve will also open to spill additional fluid.

Still another objective of this invention has been to provide a single relief valve which is controlled by two pilot valves, one of which is responsive to pressure that reaches a preset value to open the relief valve and the other of which is responsive to high rate of pressure gain to open the relief valve. Thus, the second stage valve is controlled by either one of two first stage pilot valves. The combination is thus operative to prevent pressure in the system from exceeding the pressure setting of the pressure limiting pilot valve, even if the pressure in the system tends to increase at a faster rate that the ability of former relief valves to respond to prevent pressure overtravel peaks. The rate of pressure gain pilot valve causes a preliminary and temporary actuation of the second stage valve before the pressure setting of the pressure pilot valve is reached, allowing more time for the pressure limiting pilot valve to open and take over the normal control of bypassing of fluid.

The rate of pressure gain control valve or pilot unit which accomplishes these objectives consists of a valve piston movable within a piston chamber. A valve seat is located in the piston chamber and is cooperable with a valve closure fixedly attached to the piston. The valve chamber has two ports, an inlet port and an exhaust port located on opposite sides of the valve seat. The valve closure is lightly spring biased to a normally closed position so that the two ports are normally out of communication. There is a restricted passage connecting the two piston chambers which normally permits the pressure on opposite sides of the piston to be equalized, except during times when the rate of pressure rise at the inlet port is high. Preferably, a small differential in piston area biases and cooperates with the spring to maintain the piston and attached closure valve in a closed condition.

In operation, whenever the valve inlet pressure builds up or increases at a high rate, the pressure urging the piston to an open position exceeds the pressure urging the piston to a closed condition because of the inability of the pressure to instantly equalize through the restricted passage connecting the two piston chambers. The piston then moves to equalize these pressures by displacement of the piston, and the attached valve closure then opens to spill fluid to tank or exhaust and limit the increasing pressure condition. The distance the piston moves in such a case is dependent on the compressibility of the fluid and the volume of the fluid to be compressed.

In one preferred embodiment, the control pressure for the rate of pressure gain control valve is derived from the control chamber of a second stage of relief valve. In this embodiment, opening of the rate of gain control valve results in opening of the second stage valve so as to exhaust its inlet pressure fluid to exhaust. Thus greater quantities of fluid are exhausted than could be handled through the pilot stage in the absence of the second stage valve.

The primary advantage of the rate of pressure gain control valve heretofore described is its pressure insensitive characteristic which enables it to sense pressure changes at any initiating pressure and which does not require a minimal initiating pressure. In other words, this valve responds to pressure gains irrespective of the pressure at which the gain is initiated.

Another advantage of this valve is the ease with which it may be made adjustable. Specifically, the setting of the rate of change required to initiate actuation of the valve may be varied by simply varying the size of the fluid chamber on the closing side of the piston. The larger this chamber, the more entrapped fluid it contains, and since the fluid is slightly compressible, the more easily it is forced to an open condition. Because of this characteristic, the valve may be made adjustable by a simple plug which extends into the chamber on the closure side of the piston. Moving the plug into the chamber causes the chamber volume to be reduced and thus the rate of gain required to trip the valve is caused to be increased. Alternatively, moving the plug outwardly in the chamber causes the rate of gain setting of the valve to be decreased.

Another advantage of this valve is the ease with which it is adaptable for use with a two stage relief valve so as to enable it to handle large quantities of fluid, both as a relief valve and as a rate of gain control valve, in large hydraulic apparatus.

Figure 4:
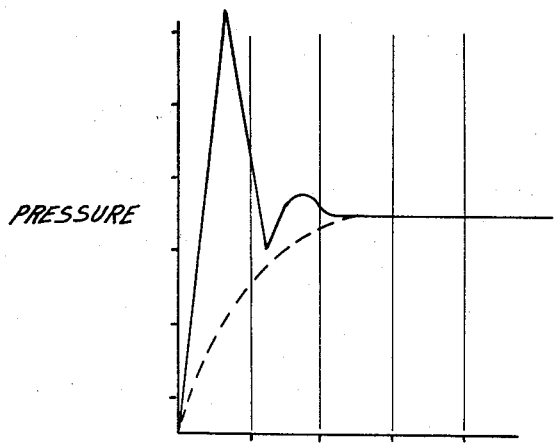
Figure 3:
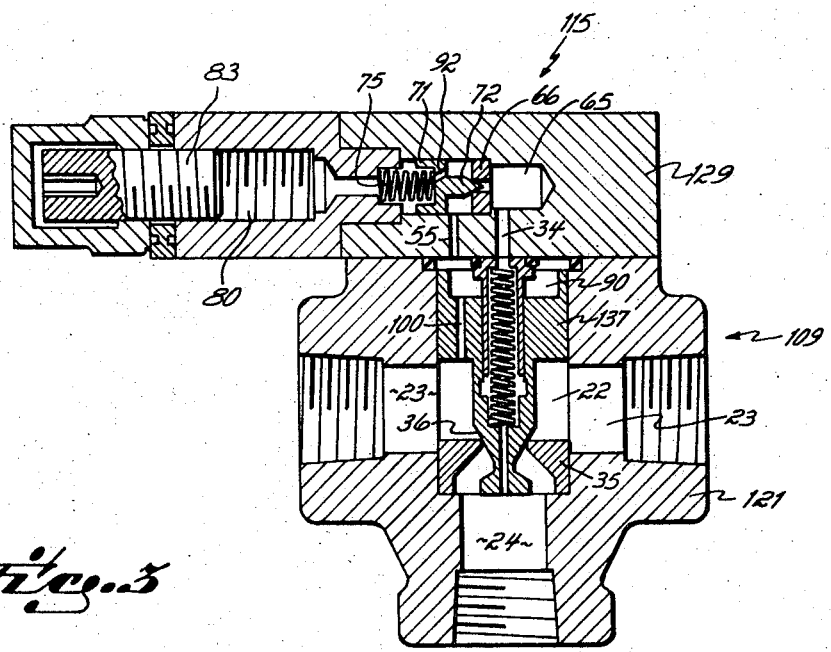
Figure 2:
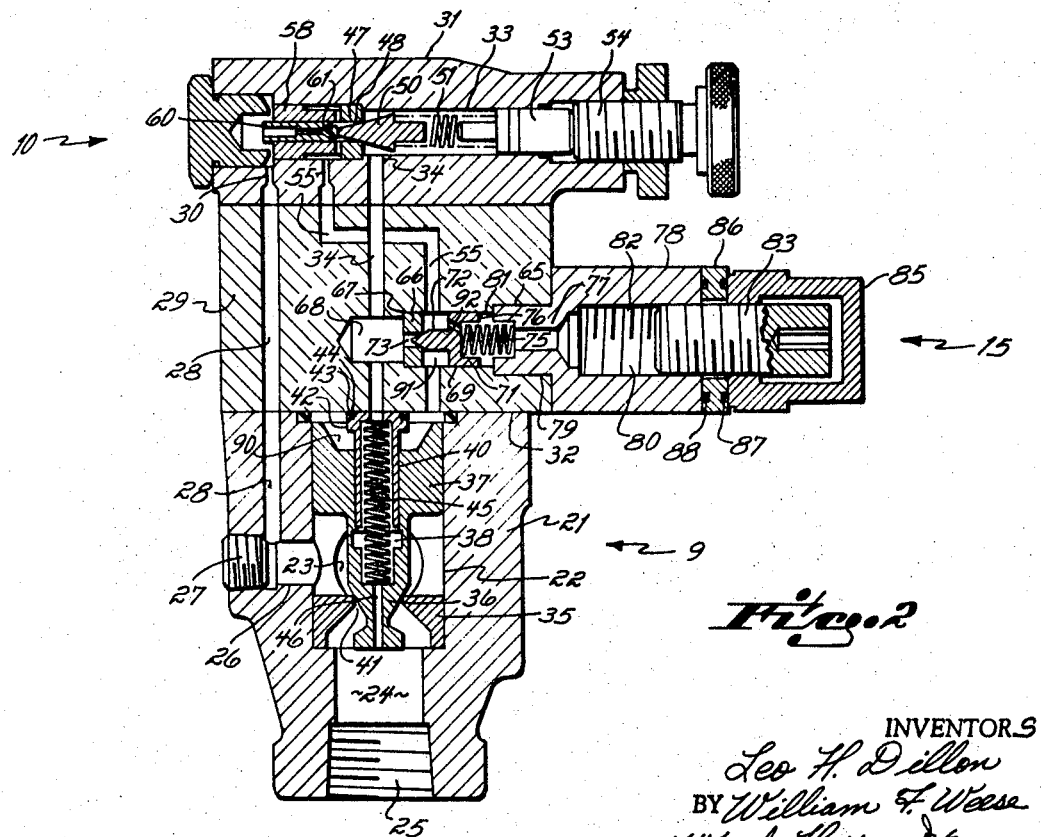

These and other objects and advantages of the invention will become more readily apparent from the following description of the drawings in which:

FIG. 1 is a diagrammatic illustration of a hydraulic apparatus incorporating the invention of this application, FIG. 2 is a cross-sectional view through the pressure control pilot valve, the rate of pressure gain control pilot valve, and the second stage of a two stage relief valve, FIG. 3 is a cross-sectional view through a combination rate of pressure gain control pilot valve and a second stage valve similar to that shown in FIG. 2, and FIG. 4 is a graph of pressure in a hydraulic system with and without the pressure gain control valve of this invention.

Referring first to FIG. 1, there is illustrated diagrammatically a hydraulic system incorporating the invention of this application. It should be appreciated that this diagrammatic illustration is only one example of an application of this invention. It is, however, useful in numerous different types of applications in hydraulic systems.

The system of FIG. 1 consists of a hydraulic pump 1 for supplying hydraulic fluid under pressure via hydraulic conduits 2, 3 and 4 to opposite sides of an expansible chamber hydraulic motor 5. Hydraulic fluid supplied through these lines passes through a relief valve 9 and a manually operated four-way directional control valve 6. Fluid pressure from the motor is vented to tank 8 via a conduit 7 and the four-way directional valve 6.

Valve 9 is controlled through a pressure actuated pilot control valve 10 which is in turn connected to the pressure side of the pump 1 via conduits 11, 12.

The hydraulic system heretofore described is all standard and conventional off-the-shelf type hardware employed in a conventional manner. In operation, the pump 1 of this network supplies hydraulic fluid through the valve 9 and the directional control valve 6 to one side of hydraulic motor 5. Fluid on the opposite side of the motor is exhausted back to the tank 8 through the four-way control valve 6. The direction of fluid flow to the motor is controlled by the position of the four-way valve 6. In the event that the hydraulic pressure passing through the relief valve 9 exceeds a preset value, the pilot valve 10 causes the valve 9 to open and dump or spill hydraulic fluid back to tank 8 so as to relieve the high pressure condition.

The invention of this application consists of a pressure rate of gain or rate of increase control valve 15 which, in the hydraulic circuit illustrated in FIG. 1, is used as a first stage pilot control valve in parallel with the pressure pilot control valve 10 to control the valve 9. This represents only one type of application of the rate of pressure gain control valve of this application but it is a fairly typical one. In other applications, though, this rate of pressure gain control valve may be used independently of or in addition to a relief valve.

To illustrate a type of condition which occurs quite frequently and which the rate of pressure gain control valve 15 of this application is designed to alleviate, assume that the hydraulic piston 16 of the motor 5 is caused to bottom out in the cylinder 17 of the motor. When this occurs, fluid being pumped by the pump 1 has no place to go until the pressure relief valve 9 opens and relieves the condition by dumping fluid through the valve 9 to tank 8. In most cases, when relief valves only are used to limit the peak pressures in the system, the pressure momentarily reaches peaks above the relief valve setting as shown in FIG. 4, due to the relatively slow opening characteristics of most relief valves.

However, when the rate of pressure limiting features are added to a relief valve, these overtravel peaks are eliminated by the softer action shown by the dotted line of FIG. 4.

The purpose of this invention is to provide a control valve or, in the application illustrated in FIG. 1, a pressure rate of gain pilot control valve, which will cause the pressure in the system to follow the dotted line condition illustrated in FIG. 4. In other words, the pressure rate of gain rise control valve 15 opens and causes the valve 9 to open almost instantaneously upon initiation of the pressure gain. This relieves the pressure gain condition for a period of time until the slower acting pressure pilot control valve 10 has time to respond to the pressure for which it is adjusted. Pilot valve 10 then opens and maintains the second stage valve 9 open so long as the excessive pressure condition exists.

Referring now to FIG. 2, there is illustrated the second stage valve 9, the pressure pilot control valve 10 and the rate of pressure gain control pilot valve 15 embodied in a single unitary package or assembly.

The valve 9 and pressure control pilot valve 10 are standard off-the-shelf items of hardware available through commercial sources. They are completely described in combination in Rennick U.S. Pat. No. 2,580,128 issued Dec. 25, 1951.

Referring now to FIG. 2, it will be seen that the valve 9 includes a body 21 provided with a central bore 22, a transverse passage 23 intersecting such bore, and a vertical passage 24 constituting an extension of the bore 22. The outer ends of the passages 23 and 24 are threaded as at 25 for the purpose of connecting the valve 9 in a hydraulic system, the passage 23 being connected with the pressure section of the hydraulic system while the passage 24 is connected with the reservoir or tank 8. The body 21 is also provided with a second lateral passage 26 closed at its outer end by a plug 27. The passage 26 communicates with a reduced vertical passage 28 which extends to the upper end of the body, through the body 29 of the rate of gain control valve 15, and into a vertical passage 20 of reduced cross-sectional area formed in the pilot valve body or cap 31. The body 29 of the rate of gain control pilot valve is secured to the top of the valve 9 by any suitable securement and the cap or body 31 of the pressure control pilot valve 10 is in turn secured to the top of the rate of gain control pilot valve 15 by any suitable type of securement. Thus the two pilot valves 10 and 15 and the valve 9 form a unitary package or subassembly for a hydraulic system.

The body 29 of the rate of gain control pilot valve 15 has a flat bottom wall 32 which closes the open upper end of the bore 22 when the body 29 is mounted on top of the body 21 in assembled relationship. The passage 30 communicates at its upper end with a bore 33 extending transversely through the cap 31. This bore is also connected with another vertical passage 34 which extends through the body 29 and is colinearly aligned with the axis of the bore 22. Before the cap 31 and body 29 are applied to the body 21 of the valve in the manufacture of the valve assembly, a valve seat insert 35 is pressed into the bore 22, this valve seat 35 engaging a shoulder between the lower end of the bore 22 and the passage 24. To prevent the flow of fluid from the bore 22, which bore forms a chamber in the body 21, a poppet valve member 36 is provided for engagement with the valve seat 35. This poppet valve forms a part of the piston body 37 which is slidably received in the bore 22 above the transverse passage 23. The piston 37 divides the bore or chamber 22 into upper and lower sections, the latter being in constant communication with a high pressure section of a hydraulic system through the passage 23. Piston 37 is formed with a longitudinally extending bore 38 for the slidable reception of a balancing piston 40 which is slightly smaller in diameter than the opening 41 in the valve seat 35. Balancing piston 40 has a small flange 42 projecting outwardly therefrom at the upper end, this flange being grooved as at 43 for the reception of an O-ring 44, the groove being so located that one side of the ring will normally project a short distance beyond the end of the piston. The piston 40 as well as the piston 37, is formed with an internal socket for the reception of a compression type coil spring 45 which tends to urge the balancing piston into engagement with the bottom wall 32 of the body 29 and the valve 36 into engagement with the seat 35. Piston 37 also has a central opening 46 which establishes communication between the passage 34 of block 29 and the outlet passage 24.

Between the passages 30 and 34 in the cap 31 there is disposed a second valve seat 47 which is provided with an opening 48. The seat 47 is engaged by a cone-shaped valve 50 which is urged toward the seat by a coil spring 51, this spring being positioned between the valve 50 and a spring abutment 53, the latter being in turn engaged by an adjusting screw 54. When the valve 50 is engaged with the seat 47 communication between the passage 30 and 34 is interrupted. The cap section 31 is provided with another passage 55 which extends from the bore 33 through the body 29 of the rate of gain control valve to the chamber 22. This passage establishes limited communication between the section of the chamber 22 remote from the valve seat and the bore 33 between the points of communication of the passages 30 and 55; the bore 33 is also provided with a guide 58 for the slidable reception of an elongated piston 60. This piston is formed with a longitudinally extending opening terminating at one end in a transverse opening 61. These openings establish limited communication between the sections of the bore 33 at opposite ends of the piston 60, the passages 28 and 30, the opening in the piston 60 and the passage 55 establishing limited communication between the sections of the chamber 22 at opposite ends of the piston 37. Thus, when fluid under pressure is introduced to the chamber 22 through the passage 23, some fluid will flow to the section of the chamber 22 above the piston to cause the pressure in this section of the chamber to normally equal the pressure in the section adjacent the valve seat, this condition being maintained so long as valve 50 is held in engagement with the second valve seat 47 and the rate of pressure rise in the system is low.

Due to the construction shown and discussed, the fluid pressure in the bore 33 between the valve 50 and the piston 60 will be the same as the pressure in the hydraulic system while valve 50 remains closed, the pressure in the bore 33 on the side of the seat 47 occupied by such valve being the same as the pressure in the reservoir. It will thus be seen that if the pressure rises in the system, valve 50 will be subjected to such pressure which will tend to move the valve toward an open position in opposition to the spring 51. The area of the valve exposed to such pressure will be equal to the area of the opening 48 in the valve seat 47. This area is slightly less than the cross-sectional area of the piston 60. Due to the establishment of limited communication between the opposite ends of the piston 60, this member will be exposed to substantially equal pressures at opposite ends and there will be no tendency for this member to move as long as such balanced pressures are maintained. It has been found that desirable results may be secured when the ratio between the cross-sectional areas of the piston 60 and the opening 48 in seat 47 is substantially equal to the ratio of the cross-sectional areas of the opening 41 in the valve seat 35 and the balancing piston 40.

In the operation of the valve, fluid pressures are introduced in the chamber 22 through passage 23. Some of this fluid flows through passages 28 and 30, through bores 61 and 33, to the upper end of the chamber 22 above piston 37. As the pressure rises on this fluid the force tending to move valve 50 from seat 47 increases. When this force is sufficient to overcome the force of spring 51, fluid commences to flow past valve 50 and through passage 34 and the interior of pistons 40 and 37 to the exhaust passage 24. This action causes a pressure differential at opposite ends of the piston 60, which pressure differential causes piston 60 to move toward valve seat 47, the end of the piston engaging valve 50 to move the same farther away from seat 47. By opening valve 50 in this manner, fluid pressure in passage 55 and in the upper end of chamber 22 is limited, or stops increasing, creating a pressure differential at opposite ends of the piston 37, the higher pressure existing at the lower end of the piston. This higher pressure urges the piston in an upward direction causing valve 36 to move away from seat 35 to permit fluid to flow directly from chamber 22 into exhaust passage 24.

If the system demand for fluid allows the system pressure existing at valve inlet 22 to fall below the pressure required to hold valve 50 open, then the valve will close. At this time the force of the fluid applied to valve 50 is insufficient to hold the same open against the action of spring 51 and the valve 50 closes, cutting off the flow of pilot fluid from the upper end of chamber 22 to exhaust. Fluid pressure in this region then quickly builds up to that in the lower end of the chamber, and piston 37 is biased in a downward direction by the spring 45 and by fluid pressure applied to the difference in areas of the upper and lower ends of the piston 37. When the piston 37 moves downwardly, valve 36 engages the seat of the insert 35 to prevent further flow of fluid from chamber 22 to the exhaust port.

In addition to the vertical passages 28, 34 and 55 which extend through the body 29 of the rate of pressure gain control valve 15, a stepped transverse bore 65 extends inwardly from one side of the body 29 and intersects the vertical bores 45 and 55. Located within this bore 65 is a third valve seat 66 which is seated against a shoulder 67 defined between a small end section 68 and an intermediate larger section 69 of the bore 65. The seat 66 is located between the two vertical bores 34 and 55, the bore 55 being a high pressure control port connected to the upper end of the bore 22 and the bore 34 being connected to the exhaust port 24. Slidably mounted within the intermediate section 69 of the bore 65 is a piston 71 which has extending inwardly from it a conically shaped valve closure 72 engageable with a cylindrical aperture 73 in the valve seat 66.

A low force helical spring 75 urges closure 72 to a closed condition. This spring 75 is located between the outer end 76 of the piston 71 and the inner end 77 of a plug 78. The plug 78 is fixedly mounted within a third large diameter end section 79 of the bore 65. An axial bore 80 extends through the plug 78. The bore 80 is threaded at its outer end, as indicated at 82, and has a screw 83 threaded therein. To prevent leakage of fluid from around the screw 83, a closure cap 85 is threaded over the end of the screw 83. This cap seats against a sealing ring or washer 86 sandwiched between the cap 85 and the end of the plug 78. O-ring seals 87 and 88 in the sides of the sealing ring 86 prevent leakage of fluid from between the cap 85 and the ring 86 or between the ring 86 and plug 78.

A small restricted orifice 92 extends through the piston 71 and interconnects the chamber 91 on the inside of the piston 71 with the chamber 81 on the outside of the piston. The chamber 81 in turn communicates with the chamber 80 in the plug 78.

In operation, in the event of a sudden increase in pressure in the fluid within the inlet lines 23 of the valve 9, the piston 37 is forced upwardly, thereby increasing the pressure of the fluid in the chamber 90 above the piston 37. This results in an increase of pressure in the chamber 91 defined between the valve seat 66 and the piston 71. If this pressure increase or gain occurs very suddenly, pressure on the opening side of the piston 71 in the chamber 91 is not instantaneously equalized by pressure on the other side of the piston 71 in chamber 81 because of the limited flow rate possible through the restricted passage 92 in the piston 71. Therefore, the piston 71 compresses the fluid in chambers 81 and 80 and moves to the right as viewed in FIG. 2, thereby allowing fluid to spill through the aperture 55 and valve seat 66 to the exhaust line 34. If any substantial amount of fluid is suddenly spilled through the valve seat 66, the valve 37 moves upwardly to open the second stage valve 9 so that the high pressure condition is relieved before the pressure in the inlet line 23 can exceed a safe value. This condition is illustrated by the dotted line in FIG. 4.

The size of the restricted passage 92 in piston 71 is such in relation to the size of the chamber 91 and the low force of spring 75 that the piston 71 and attached valve 72 remain open for at least a period of time approximately equal to the minimal time required for the pressure pilot valve 10 to open. FIG. 4 indicates that the time required for the pilot valve 10 to react to a pressure gain is about the same as the time required for operation of valve 15 and valve 9. After pressure has equalized on opposite sides of the piston 71 by the passage of fluid through the restricted passage 92, the valve closes as a result of the bias of spring 75 and the differential in areas of the piston. Thereafter, if the high pressure condition continues, the pressure control pilot valve 10 will continue to exhaust fluid through the valve seat 41 and maintain the valve 36 out of engagement with the valve seat 41. Only after the high pressure condition is relieved will the valve 36 close.

Referring now to FIG. 3, there is illustrated a second embodiment of a rate of pressure gain control pilot valve 115 in combination with a valve 109. This embodiment is generally indentical in structure and function to the pilot valve 15 and relief valve 9 of the embodiment of FIG. 2 except that it omits the pressure responsive pilot control valve 10 from the combination. This assembly of valve 109 and pressure rate of gain pilot valve 115 could be used in systems which have undesirable inherent pressure overtravel peaks, in systems having a remotely located pressure relief control valve, or in systems using relief valves with slow response time. The former type of system might incorporate a pressure compensated variable volume piston pump. Theoretically, this type of pump automatically limits system pressure to a preset desired level by moving the volume control element or hanger of the pump to a sufficiently reduced volume pumping position to just maintain the desired maximum pressure setting. In theory, this type of pump need not be used in combination with a pressure relief valve. However, as a practical matter, a pressure compensated variable volume piston pump is usually very slow acting to relieve overload conditions so that a pressure gain control valve is very desirable in this type of system to prevent pressure overtravel peaks above the desired preset level.

In the embodiment of FIG. 3, those components of the valve 109 and the rate of gain control valve 115 which are identical to the components of the valve 9 and rate of gain control valve 15 of FIG. 2 have been given identical numerals. The components which are not identical, but which correspond in function to a corresponding component of the embodiment of FIG. 2 have been given the same number but with 100 added thereto; i.e., valve 109 corresponds in function to valve 9, etc.

The valve housing 121 of this embodiment is identical to the valve housing 21 of the modification of FIG. 2 except that it does not have a horizontal port 26 connected through a vertical port 28 and valve 10 to the control chamber 90 on top of the piston 37. Rather, the chamber 22 beneath the piston 137 is connected directly to the chamber 90 above the piston through a restricted vertical passage 100 which extends vertically through the piston.

The rate of pressure gain control pilot vale 115 is identical to the pilot valve 15 except that the passages 55 and 34 which interconnect the fluid chambers on opposite sides of the valve seat 66 to control pressure and exhaust terminate at the bore 65 of the pilot valve 115 rather than extending through the body 129 of the pilot valve 115.

In operation, this embodiment of valve 109 and pilot valve 115 cooperate to prevent a high rate of pressure a gain in exactly the same manner as the valve 9 and pilot valve 15. Specifically, upon a sudden shock type increase in pressure in the inlet ports 23 of the valve 109, the pressure in the chamber 90 also suddenly increases. This sudden increase of pressure causes the piston 71 and the valve 72 to be displaced away from and out of engagement with the valve seat 66.

Since all hydraulic fluids are slightly compressible, fluid must be added to chambers 81 and 80 as pressure increases in chamber 91 in order to hold valve 72, 66 closed. If additional fluid is not added rapidly enough to keep the pressure in chambers 81 and 80 equal to that in chamber 91 during system pressure rise, the piston 71 moves.

This movement of the piston 71 results in immediate approximate equalization of pressures in chambers 91, 81 and 80. Although orifice 92 interconnects these chambers 91, 81 and 80, the flow rate through the orifice 92 is not great enough to instantly equalize the pressures in the chambers 91, 81 and 80 during the occurrence of a rapid increase in system pressure. However, the displacement or stroking of piston 71 occurs instantly to equalize, by displacing the volume of the piston, the pressures in chambers 91, 81 and 80. As a result, the chamber 91 is immediately opened to exhaust through the valve 72, 66, passages 65, 34 and 24.

This opening action allows some volume from chamber 90 to flow to exhaust, and the inlet pressure in chamber 22 then forces the piston 137 to quickly rise and open the valve 36, 35, thereby dumping a relatively large quantity of inlet volume fluid to the exhaust port 24.

During a rapid pressure rise condition, when the piston 70 moves initially to equalize the pressures in chambers 91, 81, and 80, some flow occurs from chamber 91 to chamber 81 through orifice 92 due to the influence of the low force spring 75. This spring lightly urges the piston 71 toward a position to close valve 72, 66. This closing action occurs as fluid slowly passes into chamber 81 from chamber 91 through the orifice 92. The necessary small pressure differential to cause this small flow is created by the action of the spring 75 providing a small force on piston 71. The force from spring 75 is too small to materially deter the initial quick movement of piston 71 during a circuit or system condition that tends to cause a sudden increase in system pressure. However, it prevents (valve 72, 66) opening movement of piston 71 during conditions causing a slow rate of system pressure rise. In this case, the flow through orifice 92 can cause rapid enough pressure equalization between chambers 91 and 81 to not require displacement volume from movement of this piston 71 to accomplish this pressure equalization. Since the valve 72, 66 does not open during conditions of slow pressure rise in the system, the valve 36, 35 remains closed, and volume from chamber 90 is not vented to exhaust through the valve 72, 66.

During the fast rate of system pressure rise operating condition and after the valves 72, 66 and 36, 35 are opened as described, the valve 72, 66 closes again as soon as sufficient flow passes through orifice 92. Valve 36, 35 closes as a result of flow from inlet port 23 to chamber 90 through orifice 100, the closing force being provided by spring 45. By the time this occurs, the condition causing the shock should have been relieved by another element in the system.

The primary advantage of the rate of pressure gain control valve described hereinabove is that it is sensitive to pressure gains irrespective of the initial pressure in the system when the gain occurs. In other words, it makes no difference whether the initial pressure in the system is 3,000 pounds per square inch or 100 pounds per square inch when the initial shock or fast rate of pressure rise tries to occur. The valve still reacts in a short period of time to prevent the undesireable fast rate of pressure rise. Additionally, because the pilot valve spills fluid directly to exhaust upon opening, it may be used independently of any other valve to prevent shock loads in a hydraulic system. Another advantage of this rate of pressure gain control valve is its adjustability which enables the rate of pressure rise to which the valve responds to be varied by simply varying the position of the screw 83 in the chamber 80. The smaller the volumetric capacity of chamber 80 in relation to the size of the passage 92 in the piston, the greater will be the rate of pressure rise permitted by the valve. This is due to the different quantities of fluid necessary to add to the different preset volumes of fluid in chamber 80 to cause pressure equalization of chambers 91 and 80, resulting from the compressibility of the fluid.

While we have described only a single preferred embodiment of our invention, those persons skilled in the arts to which this invention pertains will readily appreciate numerous changes and modifications which may be made without departing from the spirit of our invention. Therefore, we intend to be limited only by the scope of the appended claims.

We claim:

1. For use in a hydraulic system, a multiple stage valve comprising
    a second stage valve section and
    a first stage pilot section operable to control opening of said second stage valve section, said pilot section being responsive only to inlet pressure rates of change and operable upon detection of excessive increases in pressure rates of change to spill hydraulic fluid to a low pressure zone and thereby open said second stage valve section.

2. The multiple stage valve of claim 1 wherein said first stage pilot section includes means to adjust the rate of pressure change to which said pilot section is responsive.

3. The multiple stage valve of claim 1 which further includes a third stage pilot section operable to control opening of said second stage valve section, said third stage pilot section being responsive to preset maximum pressures only and operable upon detection of said preset maximum pressures to spill hydraulic fluid to a low pressure zone and thereby open said second stage valve section.

4. For use in a hydraulic system, a multiple stage valve comprising
    a second stage valve section, and
    a static pressure insensitive, first stage pilot section operable to control opening of said second stage valve section, said pilot section being responsive to pressure rates of change and operable in response to detection of excessive increases in pressure rates of change to open said second stage valve section, said pilot valve section being operable to detect and respond to pressure rate of changes irrespective of the initial pressure at which such changes are initiated if the rate of such changes exceeds a predetermined value.

5. The multiple stage valve of claim 4 wherein said first stage pilot section includes means to adjust the rate of pressure change to which said pilot section is responsive.

6. The multiple stage valve of claim 4 which further includes a third stage pilot section operable to control opening of said second stage valve section, said third stage pilot section being responsive to direct pressure and operable upon detection of excessive pressures to open said second stage valve section.

7. For use in a hydraulic system, a multiple stage valve comprising
   a pilot operated valve section, and
   a pilot valve first stage section operable to control opening of said pilot operated valve section, said pilot valve first stage section being responsive to pressure rates of change to open said pilot operated valve section, said pilot valve first stage section including means to adjust the rate of pressure change to which said pilot valve first stage section is responsive.

8. The multiple stage valve of claim 7 wherein said pilot valve first stage section is operable to detect and respond to pressure rates of changes irrespective of the initial pressure at which such changes are initiated whenever the rate of such changes exceeds a predetermined value.

9. A rate of pressure increase responsive pilot unit for use with a relief valve of the type having an inlet port, an exhaust port, a piston valve between said inlet port and said exhaust port, and a control chamber at the opposite end of the piston from said inlet, said pilot unit comprising
   a body with a chamber communicating at spaced points with said control chamber and with said exhaust and having substantially unrestricted communication with said exhaust,
   a valve seat in said chamber between the points of communication thereof with said control chamber and exhaust,
   valve means resiliently urged by a spring means toward said valve seat from the side thereof communicating with said control chamber, restricted passageway means connecting both sides of said valve means to the pressure of said control chamber, said valve means presenting a larger area to action of control chamber pressure on the side away from the valve seat than is presented to the action of the same chamber on the side of the valve means located adjacent the valve seat so that the net differential force acting against said valve means cooperates with said spring means to bias said valve means to a normally closed position,
   said restricted passageway means being of such a size that it restricts the passage of fluid therethrough so that fast rates of pressure increase in said control chamber cause said valve to open and spill control chamber fluid to exhaust through said open valve seat.

10. The pilot unit of claim 9 wherein said valve is generally cone shaped and said valve seat is generally circular in cross section.

11. The pilot unit of claim 9 wherein said pilot unit includes means to adjust the rate of pressure change to which said pilot unit responds.

12. In combination, a valve and a rate of pressure increase responsive pilot unit,
    said relief valve having an inlet port, an exhaust port, a piston valve between said inlet port and said exhaust port, and a control chamber at the opposite end of the piston from said inlet,
    said pilot unit comprising
    a body with a chamber communicating at spaced points with said control chamber and with said exhaust and having substantially unrestricted communication with said exhaust,
    a valve seat in said chamber between the points of communication thereof with said control chamber and exhaust,
    valve means resiliently urged by a spring means toward said valve seat from the side thereof communicating with said control chamber, restricted passageway means connecting both sides of said valve means to the pressure of said control chamber, said valve means presenting a larger area to action of control chamber pressure on the side away from the valve seat than is presented to the action of the same chamber on the side of the valve means located adjacent the valve seat so that the net differential force acting against said valve means cooperates with said spring means to bias said valve means to a normally closed position,
    said restricted passageway means being of such a size that it restricts the passage of fluid therethrough so that fast rates of pressure increases in said control chamber cause said valve to open and spill control chamber fluid to exhaust through said open valve seat.

13. The pilot unit of claim 12 wherein said pilot unit includes means to adjust the rate of pressure change to which said pilot unit responds.

14. The combination of claim 12 which further includes a pressure responsive pilot unit for said relief valve, said pressure responsive pilot unit comprising:
    a second body with a second chamber communicating at spaced points with said inlet and said control chamber and having substantially unrestricted communication with said exhaust,
    a second valve seat in said second chamber between the points of communication thereof with said control chamber and exhaust, and
    second valve means resiliently urged toward said second valve seat, said second valve means being operable to open and spill fluid from said control chamber to exhaust upon detection of pressure in said inlet port exceeding a predetermined value, spillage of fluid from said control chamber being operable to move said piston valve of said relief valve to an open condition and thereby connect said inlet port of said relief valve to said exhaust port.

15. The combination of claim 12 which further includes a pressure responsive pilot unit for the relief valve, said pressure responsive pilot unit comprising a second body with a second chamber communicating at spaced points with said inlet and said control chamber and having substantially unrestricted communication with said exhaust,
    a second valve seat in said second chamber between the points of communication thereof with said control chamber and exhaust,
    a second valve means resiliently urged toward said second valve seat from the side thereof communicating with exhaust, said second valve means presenting a uniform area to action of fluid pressure when in both open and closed condition,
    piston means disposed for movement in said second chamber between the points of communication thereof with said control chamber and said inlet, and
    passage means continually establishing restricted communication between the sections of said second chamber at the ends of said piston means.

16. A rate of pressure increase responsive pilot unit for use with a relief valve of the type having an inlet port, an exhaust port, a piston valve between said inlet port and said exhaust port, and a control chamber at the opposite end of the piston from said inlet, said pilot unit comprising:
    a body with a chamber communicating at spaced points with said control chamber and with said exhaust and having substantially unrestricted communication with said exhaust,
    a valve seat in said chamber between the points of communication thereof with said control chamber and exhaust,
    valve means resiliently urged by a spring toward said valve seat, said valve means including a piston movably mounted within said chamber, restricted passageway means through said valve means piston connecting both sides of said valve means piston to the pressure of said control chamber, the end of body chamber located on the side of said piston which is spaced away from said valve seat being closed except for said restricted passageway through said valve means piston, said valve means presenting a larger area to action of control chamber pressure on the side away from the valve seat than is presented to the action of the same pressure on the side of the valve means located adjacent the valve seat so that the net differential pressure acting against said valve means cooperates with said spring to bias said valve means to a normally closed position, said restricted passageway means in said valve being of such a size that it restricts the passage of fluid therethrough so that fast rates of pressure increases in said control chamber cause said valve to open and spill control chamber fluid to exhaust through said open valve seat.

17. A rate of pressure increase responsive valve comprising a body with a chamber communicating at spaced points with an inlet and with an outlet, said inlet being connected to a source of control pressure, and said outlet having substantially unrestricted communication with an exhaust pressure, a valve seat in said chamber between the points of communication thereof with said inlet and said outlet, valve means resiliently urged by a spring toward said valve seat, said valve means including a piston movably mounted within said chamber, restricted passageway means through said valve means piston connecting both sides of said valve means piston to said control pressure, the end of body chamber located on the side of said piston which is spaced away from said valve seat being closed except for said restricted passageway through said valve means piston, said valve means presenting a larger area to action of control chamber pressure on the side away from the valve seat than is presented to the action of the same pressure on the side of the valve means located adjacent the valve seat so that the net differential force acting against said valve means cooperates with said spring to bias said valve means to a normally closed position, said restricted passageway means in said valve means piston being of such a size that it restricts the passage of fluid therethrough so that fast rates of pressure increases in said control pressure cause said valve means to open and spill fluid to a low pressure zone through said valve seat.

18. The rate of pressure increase responsive valve of claim 17 which further includes means to adjust the rate of pressure change necessary to move said valve means.

19. The rate of pressure increase responsive valve of claim 18 wherein said means to adjust the rate of pressure change comprises a plug movable within said closed end body chamber to vary the size of said closed end body chamber.

20. The rate of pressure increase responsive valve of claim 18 wherein said valve means is generally cone-shaped and said valve seat is circular in cross section.

21. For use in a hydraulic system which includes a pump and a fluid motor, a multiple stage valve comprising a second stage valve section and a first stage pilot section operable to control opening of said second stage valve section, said pilot section being responsive only to inlet pressure rates of change and operable upon detection of excessive increases in pressure rates of change to spill hydraulic fluid to a low pressure zone and thereby open said second stage valve section, and thereby reduce the volume delivery from said pump to said fluid motor.

22. The multiple stage valve of claim 21 wherein said first stage pilot section includes means to adjust the rate of pressure change to which said pilot section is responsive.

23. The multiple stage valve of claim 21 which further includes a third stage pilot section operable to control opening of said second stage valve section, said third stage pilot section being responsive to preset maximum pressures only and operable upon detection of said preset maximum pressures to spill hydraulic fluid to a low pressure zone and thereby open said second stage valve section.